US008176128B1

(12) United States Patent
Batty et al.

(10) Patent No.: US 8,176,128 B1
(45) Date of Patent: May 8, 2012

(54) METHOD OF SELECTING CHARACTER ENCODING FOR INTERNATIONAL E-MAIL MESSAGES

(75) Inventors: Frederic C. Batty, San Jose, CA (US); Zhao Y. Wang, Sunnyvale, CA (US)

(73) Assignee: Oracle America, Inc., Redwood City, CA (US)

(*) Notice: Subject to any disclaimer, the term of this patent is extended or adjusted under 35 U.S.C. 154(b) by 1355 days.

(21) Appl. No.: 11/292,432

(22) Filed: Dec. 2, 2005

(51) Int. Cl.
*G06F 15/16* (2006.01)

(52) U.S. Cl. ............................................ 709/206; 704/8
(58) Field of Classification Search .................... 709/206
See application file for complete search history.

(56) References Cited

U.S. PATENT DOCUMENTS

| | | | | |
|---|---|---|---|---|
| 5,784,069 | A * | 7/1998 | Daniels et al. | 345/467 |
| 6,154,758 | A * | 11/2000 | Chiang | 715/263 |
| 6,204,782 | B1 * | 3/2001 | Gonzalez et al. | 341/90 |
| 6,292,768 | B1 * | 9/2001 | Chan | 704/1 |
| 7,039,637 | B2 * | 5/2006 | Murray et al. | 1/1 |
| 7,191,114 | B1 * | 3/2007 | Murray et al. | 704/2 |
| 2002/0120654 | A1 * | 8/2002 | Xu | 707/536 |
| 2002/0194388 | A1 * | 12/2002 | Boloker et al. | 709/310 |
| 2005/0044495 | A1 * | 2/2005 | Lee et al. | 715/533 |
| 2005/0114367 | A1 * | 5/2005 | Serebrennikov | 707/100 |
| 2005/0197829 | A1 * | 9/2005 | Okumura | 704/10 |
| 2005/0210009 | A1 * | 9/2005 | Tran | 707/3 |
| 2007/0021956 | A1 * | 1/2007 | Qu et al. | 704/8 |

* cited by examiner

*Primary Examiner* — Patrice Winder
*Assistant Examiner* — Tauqir Hussain
(74) *Attorney, Agent, or Firm* — Martine Penilla Group, LLP

(57) ABSTRACT

Methods, data structures, and systems are provided for encoding communication data. The methods allow an application to compose communication data in any language and using any characters it wishes. One method constructs a Bitmask Table that includes Bitmask Character Values for each character represented in a national character where the Bitmask Character Value represents which National Character Set among a group of National Character Sets can be used to encode communication data containing a particular character, with adjustments for characters represented in East-Asian Chinese, Japanese, and Korean (CJK) languages. Another method encodes the communication data, by utilizing the Bitmask Table, in a format that conforms to data communication standards and interoperates with most third party recipient clients worldwide.

23 Claims, 6 Drawing Sheets

METHOD OF SELECTING CHARACTER ENCODING FOR INTERNATIONAL E-MAIL MESSAGES

BACKGROUND

1. Field of the Invention

This invention relates generally to character encoding, and more particularly to a method for encoding e-mail or other communication data in a format that is conformant with recognized data communication standards and that interoperates with most third party recipient clients worldwide.

2. Description of the Related Art

Conventionally, in the context of computer storage and communication, character encoding consists of assigning a code that associates a set of characters called a "character repertoire" with a "coded character set" (also called a "character encoding"). A character repertoire is a full set of abstract characters that a system or a natural language supports. A coded character set or character encoding specifies a representation of each of the characters from the character repertoire using a number of integer codes.

For example, the representation of strings depends on the choice of a character repertoire and the method of character encoding. Older implementations were designed to work with repertoire and encoding schemes defined by ASCII, or more recent extensions like the ISO 8859 series. The need to communicate across multiple computer systems in multiple languages lead to the development of modern character encoding implementations that often use the extensive repertoire defined by Unicode along with a variety of complex encodings such as 8-bit Unicode Transformation Format (UTF-8) and 16-bit Unicode Transformation Format (UTF-16). However, even with the development of these modern character set and encoding implementations, e-mail and other forms of communication across multiple systems or in multiple languages still presents several difficulties, as discussed below.

In most popular Web-based e-mail client systems, no real effort is made to properly encode e-mail messages. Typically, after a user composes an e-mail, the web-based system browser incorrectly converts characters of the e-mail using Hyper Text Markup Language (HTML) escaped Unicode sequences, into characters that do not exist in the browser's active character set. The corrupted e-mail is then encoded and sent to an e-mail recipient. Once received by the recipient, the e-mail will only display correctly if the recipient also uses a Web-based client system that does not correctly escape HTML when displaying plain text e-mail, a case of two wrong behaviors canceling each other. However, in the more behaved client systems, the corrupted e-mail will be displayed to the recipient as an unintelligible sequence of number and symbols. The situation is slightly better if the recipient user uses characters that were present in the browser character set used by the sending application but, even so, this scenario results in e-mail that violate e-mail standards as they contain 8-bit data in the headers and the data in the message body is unaccompanied by a character set label. The headers typically get corrupted by mail servers that like to correct illegal e-mail, and even when that doesn't happen, the messages still only display correctly if the receiving client explicitly selects the character set used by the sending application, assuming the option to make such a selection is even available to the user.

In other Web-based e-mail client systems, the user is allowed to select their preferred language in a webmail application, but then the user is limited to only the characters available in the character set commonly used for that language. So, for example, a user composing an e-mail with English set as the preferred default language cannot view or compose e-mail with Chinese characters. Moreover, if despite having English as the default language setting, the user composes an e-mail that includes Chinese characters, the message would be received in an invalid, often unreadable format by the recipient.

In modern PC-based e-mail client systems ("fat client" systems), users are typically allowed to choose the type of encoding to be used in outgoing e-mail messages. However, this approach is not ideal because most users are not familiar with character encoding requirements and, as a result, users typically make incorrect character encoding selections. If a character encoding selection is made incorrectly, the user will likely experience annoying error messages from their client system, assuming the client system is doing checking. To overcome these errors, the user will generally select the first character encoding type that does not result in the generation of error messages even though the character encoding selection may not be the correct choice to interoperate with client systems used by the e-mail recipient.

Moreover, the approach of allowing a user to select the character encoding is generally less suitable for Web-based applications than for PC-based applications. In Web-based applications there are complicated exchanges between the client system and the server system that need to take place for correct message validation, which generally makes any encoding errors made by the user more problematic.

In view of the forgoing, there is a need for an encoding approach that allows a user to compose e-mail or any other communication data in any language using any characters and allows the e-mail recipient to properly display the transmitted content.

SUMMARY

In one embodiment, the present invention provides a method for enabling a computer system to facilitate the encoding of communication data. The method comprises enabling the definition of a bitmask table having a bitmask character value, wherein the bitmask character value defines a representation of a character in a character set and the bitmask character value is adjusted based on an origin language corresponding to the character. The method also comprises enabling the receipt of communication data, wherein the communication data includes the character. The method further comprises enabling the generation a bit value based on the bitmask character value, selecting the character set based on the bit value, and enabling the encoding the character, wherein the character is encoded based on the selected character set.

In another embodiment, the present invention provides a bitmask table for facilitating encoding communication data, the bitmask table capable of being executed by a computer. The bitmask table comprises a character number related to a character, the character number defining an index into the bitmask table and a bitmask character value related to the character number, the bitmask character value defining a representation of the character in a character, wherein the bitmask character value is adjusted based on an origin language corresponding to the character.

In another embodiment, the present invention provides a computer system for facilitating encoding communication data. The computer system comprises a client code module executed by the computer, the client code module capable of accepting communication data input by a user, the communication data including a character. The computer system also provides a bitmask table executed by the computer, the bitmask table having a bitmask character value, the bitmask character value defining a representation of the character in a character set wherein the bitmask character value is adjusted based on an origin language corresponding to the character. The computer system further provides a server code module executed by the computer, the server code module capable of receiving communication data from the client code module, accessing the bitmask character value and encoding the communication data on the bitmask character value.

In another embodiment, the present invention provides a computer-readable media for directing a computer to facilitate the encoding of communication data, the computer-readable media comprising instructions for defining a bitmask table having a bitmask character value, wherein the bitmask character value defines a representation of a character in a character set and the bitmask character value is adjusted based on an origin language corresponding to the character. The computer-readable media also provides instructions for receiving communication data, wherein the communication data includes the character and instructions for generating a bit value based on the bitmask character value. The computer-readable media further provides instructions for selecting the character set based on the generated bit value; and instructions for encoding the character, wherein the character is encoded based on the selected character set.

Other aspects and advantages of the invention will become apparent from the following detailed description, taken in conjunction with the accompanying drawings, illustrating, by way of example, the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION

An approach is provided that allows a user to compose e-mail or any other communication data in any language using any characters. The approach provides a capability to encode e-mail or other communication data, by utilizing a Bitmask Table, in a format that conforms to established data communication standards and interoperates with most third party recipient client systems worldwide to facilitate the mixing and sharing information in a variety of languages and across different systems.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

The present invention includes several aspects and is presented below and is discussed in connection with the Figures and embodiments. First, an overview of one embodiment of the present invention is presented. Next, embodiments of the features of the Bitmask Table and the encoding method are discussed. Finally, one embodiment of standard hardware appropriate for use with the present invention is described.

Figure 1:
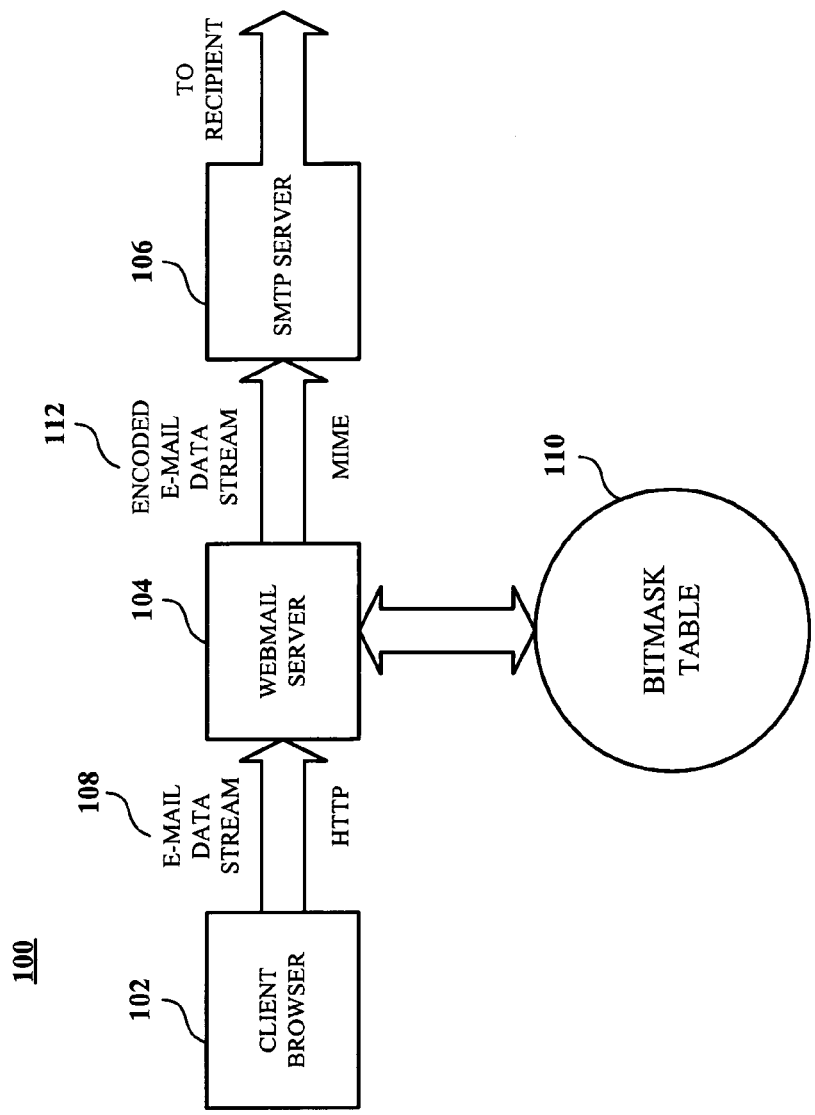
FIG. 1 is a block diagram illustrating a basic approach of the present invention.

In FIG. 1, an embodiment of the present invention provides an e-mail system architecture 100 that includes a Client Browser (Web browser) 102, a Webmail Server (Web-based e-mail server) 104, and a SMTP (Simple Mail Transfer Protocol) Server 106. It is important to note that the present invention is not limited to the Web-based system architecture 100 shown in the FIG. 1 embodiment, but the present invention can also be implemented in other architectures including, shared-library architectures, PC-based "fat client" e-mail system architectures, etc. The Client Browser 102 can be a client code module software application executing on a computer (not shown) that allows a user to view web pages and interact with various types of Internet resources, including resources provided by the Webmail Server 104 which facilitate composing, sending and receiving e-mail. The Webmail Server 104 is not limited to a Web-based e-mail server, but can be any type of e-mail server, including PC-based e-mail servers, etc.

In the present embodiment, as shown in FIG. 1, an e-mail message 108 is sent by a user from the Client Browser 102 to the Webmail Server 104. In one example, the e-mail message 108 is sent from the Client Browser 102, using HTTP (Hyper Text Transfer Protocol), to the Webmail Server 104 as a UTF-8 encoded data stream. UTF-8 is a lossless, variable-length Unicode character encoding standard that is useful for transmission over 8-bit Electronic Mail systems. However, it is important to note that the Webmail Server 104 of the present invention is not limited to communicating with the Client Browser 102 using data stream or UTF-8 format, but may provide such communication using standard communication formats, including UTF-16, UTF-32, etc.

In FIG. 1, upon receiving the e-mail message 108, the Webmail Server 104 encodes the e-mail message 108 utilizing an approach that does not restrict the user to particular types of characters that can be used to compose e-mail. This approach potentially increases the complexity of encoding e-mail due to the numerous types of characters that can be added to the e-mail including, but not limited to, a mixture of characters from any of the world's languages, special characters from Microsoft™ extensions to the ISO-8859 family of character sets, or any combinations thereof. One simplistic solution to this encoding complexity could be to simply encode outgoing e-mail using UTF-8. However, currently UTF-8 is not fully supported by all mail clients (including MicroSoft Outlook Express™). Additionally, because UTF-8 uses groups of bytes to represent the Unicode encoding standard for the entire alphabets of many of the world's languages where each character requires one to four bytes per character, large amounts of memory resources are needed (nearly twice the memory resources normally required) and, for the common case where the characters that need to be encoded exist in only one language, the majority of the UTF-8 data is not utilized.

Therefore, to accommodate those cases where the characters that need to be encoded exist in only one language or where there is a mixture of characters etc., server code module application software executing on the Webmail Server 104 utilizes, as discussed in detail below, a Bitmask Table 110 to identify a National Character Set that can be used to encode e-mail data and, if no National Character Set is identified, to select a standard encoding format to encode the e-mail data. It is important to note that the present invention is fully extendible to accommodate other National Character Sets not provided herein. The National Character Sets provided in one embodiment may include:

| | |
|---|---|
| US-ASCII | /* English and a few other languages */ |
| ISO 8859-1 | /* Most Western European languages */ |
| ISO 8859-15 | /* Western European languages with Euro support */ |
| Windows 1252 | /* Western European languages with Euro support and Microsoft extensions */ |
| ISO 8859-2 | /* Latin2 (Central European) */ |
| ISO 8859-4 | /* Latin4 (Baltic) */ |
| ISO 8859-5 | /* Cyrillic */ |
| ISO 8859-6 | /* Arabic */ |
| ISO 8859-7 | /* Greek */ |
| ISO 8859-8 | /* Hebrew */ |
| ISO 8859-9 | /* Latin5 (Turkish) */ |
| TIS-620 | /* Thai */ |
| ISO 2022-JP | /* Japanese */ |
| GB2312 | /* Chinese */ |
| BIG5 | /* Traditional Chinese */ |
| EUC-KR | /* Korean */ |

In the instance where a National Character Set cannot be identified by the Webmail Server 104, as discussed in detail below, the Webmail Server 104 will simply encode the data stream 108 using a default encoding format like UTF-8 or some other accepted encoding format.

As shown in FIG. 1, after the data stream 108 has been encoded by the Webmail Server 104, the Webmail Server 104 maps the encoded data stream into MIME (Multipurpose Internet Mail Extensions) format and sends the resulting message to the SMTP Server 106 where the encoded e-mail message 112 is then transferred to a recipient. MIME is an Internet Standard for the format of e-mail that defines mechanisms for sending and receiving many kinds of information in e-mail, including text in languages other than English using character encodings other than ASCII as well as 8-bit binary content. Currently MIME standards include, RFC2822, RFC2045, and RFC2047 etc. Since the basic Internet e-mail transmission protocol, SMTP, supports only 7-bit ASCII characters, virtually all Internet e-mail is transmitted via SMTP in MIME format.

A first step in providing the encoding approach of an embodiment of the present invention is to build a Bitmask Table with as many entries as there are characters in Unicode's "Basic Multilingual Plane" (BMP) character set. Today, Unicode is the de facto character encoding standard. Unicode is capable of addressing more than 1.1 million code points (characters) and has provisions for 8-bit, 16-bit and 32-bit encoding forms. The 16-bit encoding form, UTF-16, is used as Unicode's default encoding form and this form allows for Unicode's code points to be distributed across 17 "planes" with each plane addressing over 65,000 characters each. Specifically, the characters in Plane 0 (or as it is commonly called the BMP) are used to represent most of the world's written scripts, characters used in published, mathematical and technical symbols, geometric shapes, basic dingbats (including all level-100 Zapf Dingbats), and punctuation marks. In addition, Unicode also supports the characters in the East-Asian language Chinese, Japanese, and Korean (CJK) ideographs. These additional characters are mapped beyond Plane 0 using an extension method called "surrogate pairs." It is important to note that although the present embodiment utilizes the Unicode BMP character encoding standard, embodiments of the present invention may be practiced by using other character encoding standards.

Figure 2A:
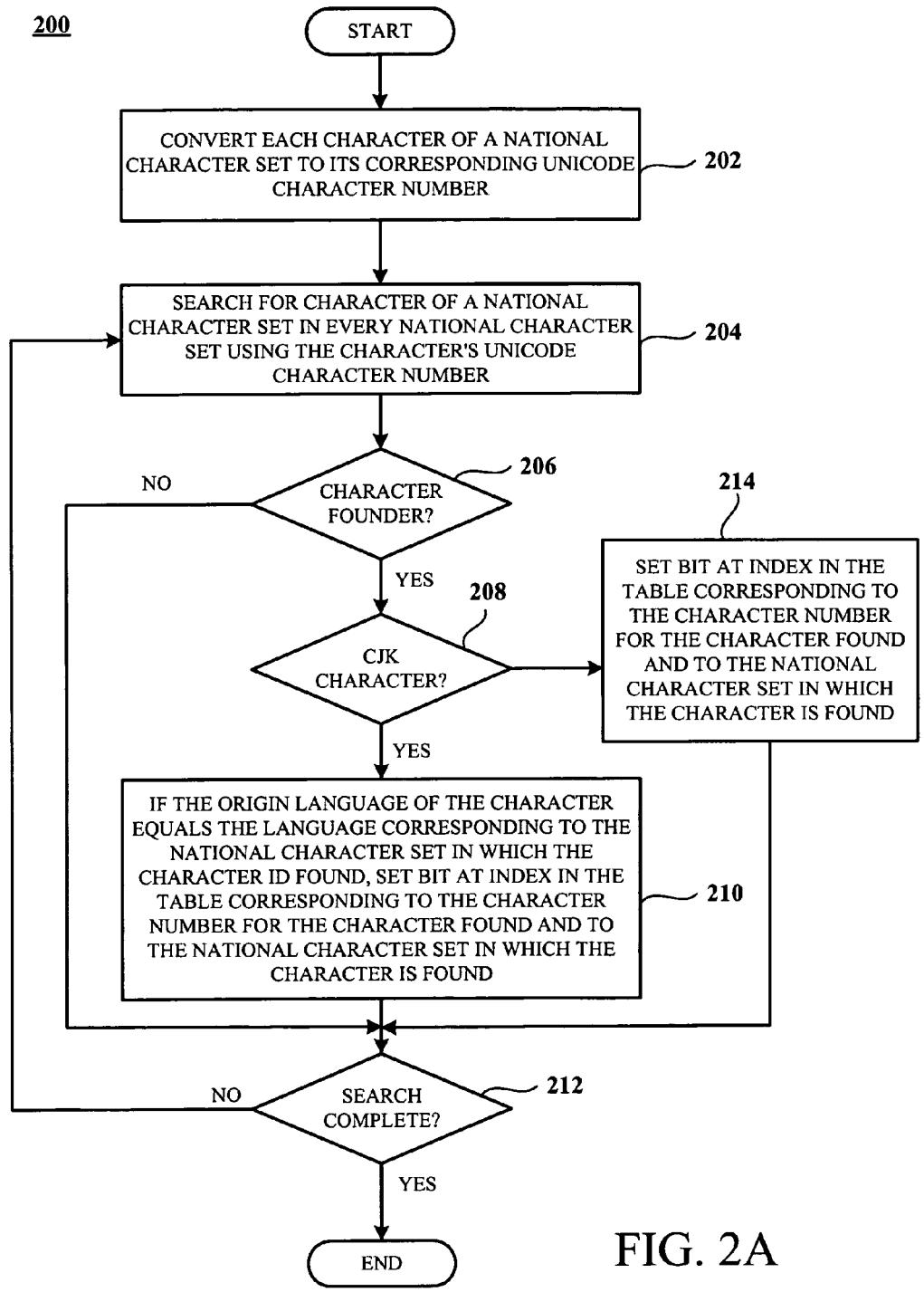
FIG. 2A is a flowchart showing a method for creating a Bitmask Table, in accordance with an embodiment of the present invention.

FIG. 2A is a flowchart showing a method 200 for constructing a Bitmask Table, in accordance with an embodiment of the present invention. In an initial character conversion operation 202, each character of a National Character Set is converted to its corresponding Unicode BMP character number (code point). As mentioned previously, an embodiment of the present invention provides for utilizing National Character Sets that include US-ASCII, ISO 8859-1, ISO 8859-15, Windows-1252, ISO 8859-2, ISO 8859-4, ISO 8859-5, ISO 8859-6, ISO 8859-7, ISO 8859-8, ISO 8859-9, TIS-620, ISO 2022-JP, GB2312, BIG5, and EUC-KR.

In a character number search operation 204, proceeding one National Character Set at a time and, within each National Character Set, one character number at a time, each Unicode character number of a National Character Set is searched for in every National Character Set.

In a character found operation 206, if the currently searched Unicode character number is found in a National Character Set, i.e. the National Character Set can be used to represent the character, the method 200 continues with operation 208. If the currently searched Unicode character number of a National Character Set is not found in another National Character Set, the method 200 continues with operation 212.

In a CJK character check operation 208, if the character corresponding to the currently searched Unicode character number represents a CJK character, the method 200 continues in operation 210. If the character corresponding to the currently searched Unicode character number does not represent a CJK character, the method 200 continues in operation 214.

In a CJK character set operation 210, an adjustment is made to facilitate the best possible National Character Set selection where e-mail or other communication data contains characters from the Chinese, Japanese or Korean National Character Sets. Specifically, in one embodiment of the present invention, if the origin language of a character is the same as the language corresponding to the National Character Set in which the character is found, a bit of the Bitmask Character Value for the character is set to '1' at an index in the Bitmask Table corresponding to the Character Number for the character and to the National Character Set in which the character is found. Otherwise, the bit is set to '0' so that the National Character Set is removed from Bitmask Character Value of the character. For example, both the Korean and Chinese National Character Sets contain Katakana and Hiragana characters, which are Japanese symbols. However, it is unlikely that a Korean or Chinese e-mail is written entirely in Katakana or Hiragana. Therefore, the Korean and Chinese National Character Sets are removed from the Bitmask Character Value for Katakana or Hiragana characters.

In a set character set operation 214, one bit is set in the Bitmask Table for each National Character Set that can be used to represent a character. For example, if a character is represented in a National Character Set, the bit corresponding to that National Character Set is set to '1', otherwise the bit is set to '0', as shown in FIG. 2B.

Figure 2B:
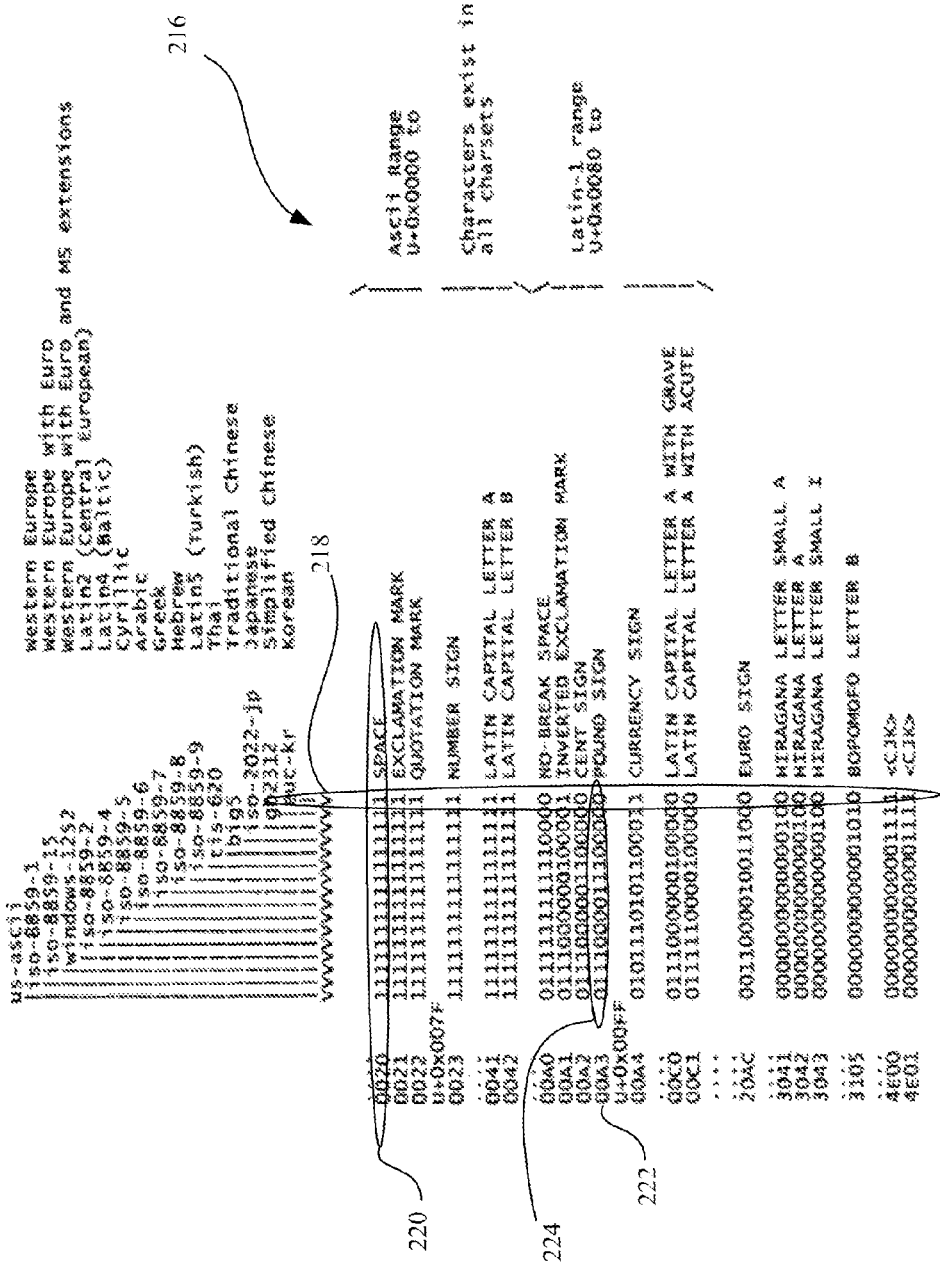
FIG. 2B is an illustration showing an exemplary Bitmask Table, in accordance with the method of FIG. 2A.

FIG. 2B provides an illustration of an exemplary Bitmask Table 216 according to an embodiment of the present invention. The Bitmask Table 216 of FIG. 2B is provided for illustrative purposes only and should not be interpreted to limit the embodiments of the present invention. In FIG. 2B, each column 218 of the Bitmask Table 216 represents one National Character Set and each row 220 of the Bitmask Table 216 represents a Unicode Character Number 222, such that an index of the Bitmask Table 216 is a Unicode Character Number 222 and bitmask table[index] contains a Bitmask Character Value 224 where each bit of the Bitmask Character Value 224 corresponds to whether a National Character Set can be used to represent that character. For example, as shown in FIG. 2B, the Bitmask Character Value 224 for the pound sign character ('#') is a 16-bit value equal to '0111000011100000' and the Unicode Character Number 222 for the pound sign character is '00A3'. Thus, according its Bitmask Character Value, the pound character '#' is represented in the ISO 8859-1, ISO 8859-15, Windows-1252, ISO 8859-7, ISO 8859-8, and ISO 8859-9 National Character Sets. Conversely, the US-ASCII, ISO 8859-2, ISO 8859-4, ISO 8859-5, ISO 8859-6, TIS-620, ISO 2022-JP, GB2312, BIG5, and EUC-KR National Character Sets cannot be used to represent the character '#'. Referring again to FIG. 2A, after the table construction operation 214 is complete, the method 200 continues at operation 212.

In a search complete operation 212, referring again to FIG. 2A, a decision is made as to whether the construction of the Bitmask Table is complete. In one embodiment, the Bitmask Table construction is complete when every Unicode character number for every National Character Set has been searched for in every other National Character Set and appropriate bit values set for each Unicode character number, as discussed above. If the search is complete, the method 200 is concluded. If the search is not complete, the method 200 continues with another character number search operation 204.

In an embodiment of the present invention, the Bitmask Table can be constructed when the Webmail Server 104 (see FIG. 1) is initialized. The Bitmask Table can reside on the Webmail Server 104 as a library, a file, data structure, a hash table, etc.

Advantageously, based on the discussion above, the Bitmask Table allows embodiments of the present invention to encode e-mail or other communication data in a format that conforms to e-mail standards and interoperates with most third party e-mail clients worldwide.

As previously mentioned, an e-mail recipient can be located anywhere in the world, so an encoding approach is desired that allows a Web-based, PC-based etc. e-mail server to interoperate with the most obscure or obsolete mail clients or gateways used around the world even where such mail clients or gateways only support their country's most popular National Character Set.

The encoding method provided in an embodiment of the present invention meets these needs and consists of selecting a National Character Set for use to encode e-mail by applying a "binary AND" of the Bitmask Character Value 224 in the Bitmask Table 216 (see FIG. 2B above) for every character in the e-mail message. Through this iterative process, the National Character Set(s) that can be used to encode the e-mail are identified and the e-mail is encoded using one of these National Character Sets.

Figure 3:
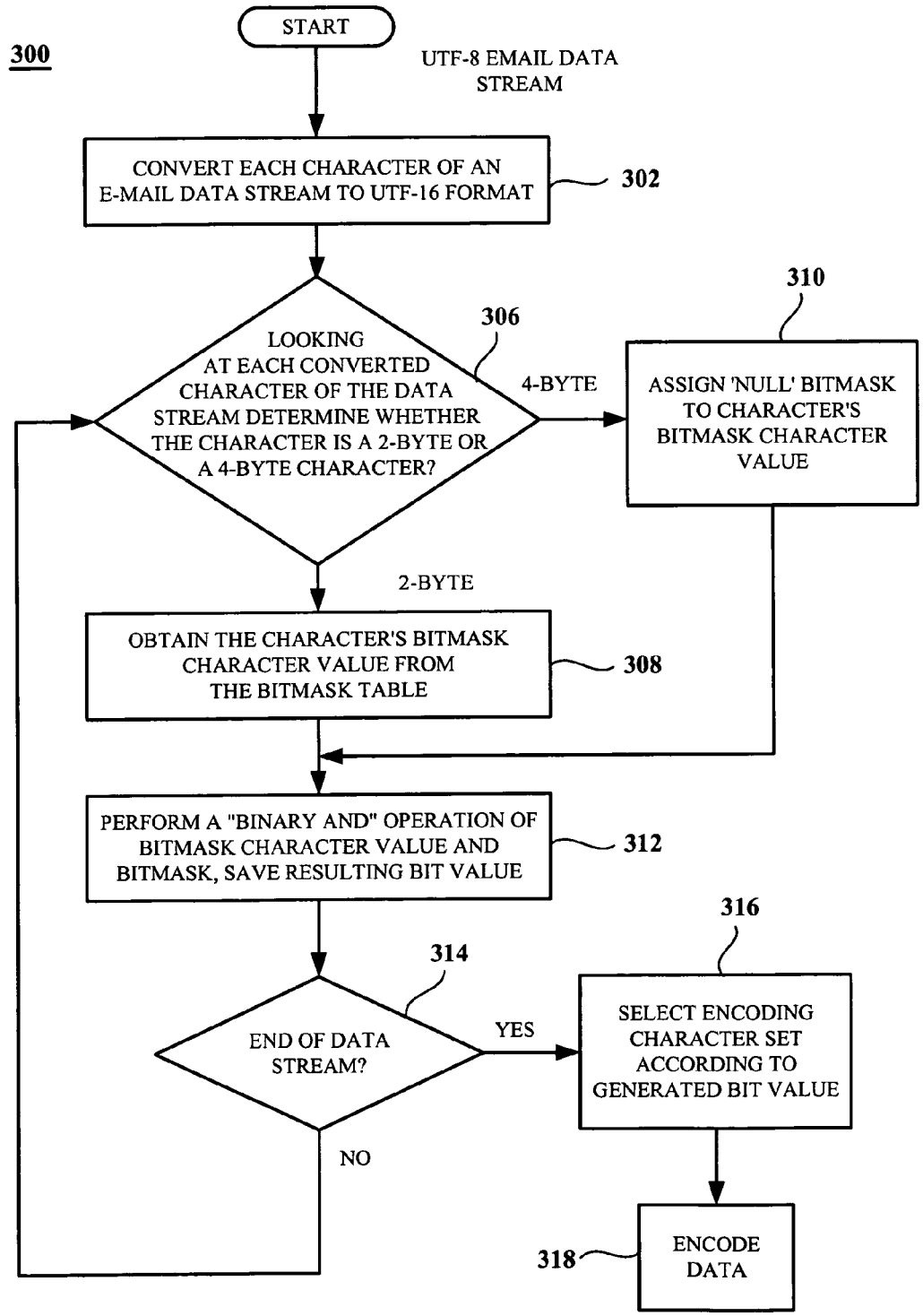
FIG. 3 is a flowchart showing a method for encoding communication data, in accordance with an embodiment of the present invention.

FIG. 3 is a flowchart showing a method 300 for encoding e-mail or other communication data, in accordance with an embodiment of the present invention. In an initial character conversion operation 302, each character of an e-mail data stream 304 is read, one character at a time, and converted to its UTF-16 character number equivalent using operations that will be apparent to one of ordinary skill in the art. As previously mentioned, UTF-16 is Unicode's default encoding form which provides encoding that can be used to represent most of the world's written scripts. However, the conversion operation 302 can accommodate e-mail data that is formatted in any encoding form, including UTF-8, etc. The e-mail data stream 304 is provided to the method 300 encoding process when a user composes and sends an e-mail using the Client Browser illustrated in FIG. 1.

In a character byte check operation 306, a decision is then made as to whether the converted character is a 2-byte Unicode character number or a 4-byte Unicode character number, using operations that will be apparent to one of ordinary skill in the art. If the converted character is a 2-byte Unicode character number, the method 300 continues with operation 308. Otherwise, if the converted character is a 4-byte Unicode character number, the method 300 is continued in default operation 310.

In a default operation 310, a null bitmask (0x0000) is stored in a temporary bitmask variable when a 4-byte Unicode character number is detected in the e-mail data stream and the method 300 continues in operation 312. In the present embodiment, a 4-byte Unicode character number typically indicates that the character corresponding to the Unicode character number is outside of Unicode's Plane 0 character set, these characters are rare in practice.

In a bitmask table lookup operation 308, the Bitmask Character Value corresponding to the Unicode character number for the character currently being read from the e-mail data stream is retrieved from the Bitmask Table discussed above. The Bitmask Character Value is then stored in a temporary bitmask variable and the method 300 continues with operation 312.

In a "binary AND" operation 312, a bit AND is performed on the temporary bitmask variable (assigned in either operation 308 or 310) and a Bitmask Variable. The Bitmask Variable is initialized to 0xFFFF during pre-processing. The result of the bit AND operation of the temporary bitmask variable and the Bitmask Variable is then stored back to the Bitmask Variable (i.e. Bitmask Variable=Bitmask Variable AND temporary bitmask variable).

For example, using an e-mail data stream containing the string "Sun," the Bitmask Character Values from the Bitmask Table for each of the characters in "Sun," obtained in the bitmask table lookup operation 308 discussed above can be as shown in Table A:

TABLE A

| | |
|---|---|
| 'S' | bitmask character value = '1111 1101 0011 0000' |
| 'u' | bitmask character value = '1011 1000 0001 1100' |
| 'n' | bitmask character value = '1111 1111 0000 0000' |

The successive bitwise AND operations on the characters in the string "Sun" provide the following:

| | |
|---|---|
| 1111 1111 1111 1111 | (bitmask initialized to 0xFFFF) |
| 1111 1101 0011 0000 | (bitmask character value for 'S') |
| 1111 1101 0011 0000 | (result of AND operation) |
| 1011 1000 0001 1100 | (bitmask character value for 'u') |
| 1011 1000 0001 0000 | (result of AND operation) |
| 1111 1111 0000 0000 | (bitmask character value for 'n') |
| 1011 1000 0000 0000 | (generated bit value) |

In an end of data stream check operation 314, a decision is made as to whether every character of the e-mail data stream has been read. If the every character of the e-mail data stream has been read, the method 300 is concluded at operation 316. Otherwise, the method 300 continues with another character byte check operation 306 and so on, until the each character of the e-mail data stream has been read.

In a character set selection operation 316, a National Character Set is selected that can be used to encode an e-mail data stream. Specifically, the Generated Bit Value obtained from successive bit AND operations in operation 312, indicates which of the National Character Sets, if any, can be used to encode the e-mail data stream.

As previously mentioned, each bit position in a bit value corresponds to a National Character Set. In one embodiment of the present invention, as mentioned above in FIG. 2, there are 16 National Character Sets that can be used to create a 16-bit bitmask beginning with the US-ASCII character set at bit position 0 and ending with the EUC-KR character set at bit position 15. If a bit position is set to '1' then the National Character Set corresponding to that bit position can be used to encode the e-mail. Conversely, if the same bit position is set '0' then the National Character Set corresponding to that bit position cannot be used to encode the e-mail. Therefore, continuing with the example provided above, using the Generated Bit Value result of '1011 1000 0000 0000', the following National Character Sets can be used to encode an e-mail containing the string "Sun" as shown in Table B:

TABLE B

| 1011 1000 0000 0000 | (US-ASCII) |
|---|---|
| 1011 1000 0000 0000 | (ISO 8859-15) |
| 1011 1000 0000 0000 | (Windows 1252) |
| 1011 1000 0000 0000 | (ISO 8859-2) |

In an embodiment of the present invention where, as in the example provided above in Table B, there is more than one National Character Set that can be used to encode an e-mail, the selection of a National Character Set can be made based on any criteria, including a predetermined order of preference, etc. In the case where there are no character sets that can be used to encode an e-mail, i.e. the Generated Bit Value is NULL, the e-mail can be encoded using any encoding standard, including UTF-8, UTF-16, etc.

In one embodiment of the present invention, if there is more than one National Character Set that can be used to encode an e-mail message and US-ASCII is among those National Character Sets, the US-ASCII character set is selected for encoding. If the user's preferred language is known and that language is among the National Character Sets that can be used for encoding, the character set corresponding to that language is selected. Otherwise, the National Character Set is selected from the National Character sets that can be used to encode the e-mail based on a designated order of preference. For example, referring to the National Character Sets represented in FIG. 2B, an order of preference can begin with US-ASCII at the most preferred and end with EUC-KR as the least preferred.

In an encode operation 318, the e-mail data stream is encoded utilizing the National Character Set selected in the character set selection operation 316.

Figure 4A:
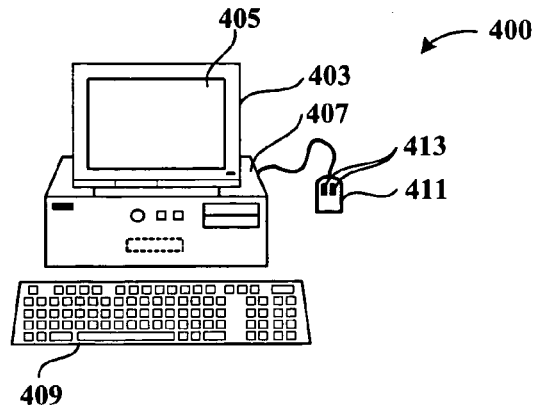
FIG. 4A is an illustration of a computer system suitable for use with the present invention.

In view of the discussion above, FIG. 4A is an illustration of an embodiment of a computer system 400 suitable for use with the present invention including display 403 having display screen 405. Cabinet 407 houses standard computer components (not shown) such as a disk drive, CDROM drive, display adapter, network card, random access memory (RAM), central processing unit (CPU), and other components, subsystems and devices. User input devices such as a mouse 411 having buttons 413, and keyboard 409 are shown.

Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g. laptop, palmtop, pentop, server, workstation, mainframe). Any hardware platform suitable for performing the processing described herein is suitable for use with the present invention.

Figure 4B:
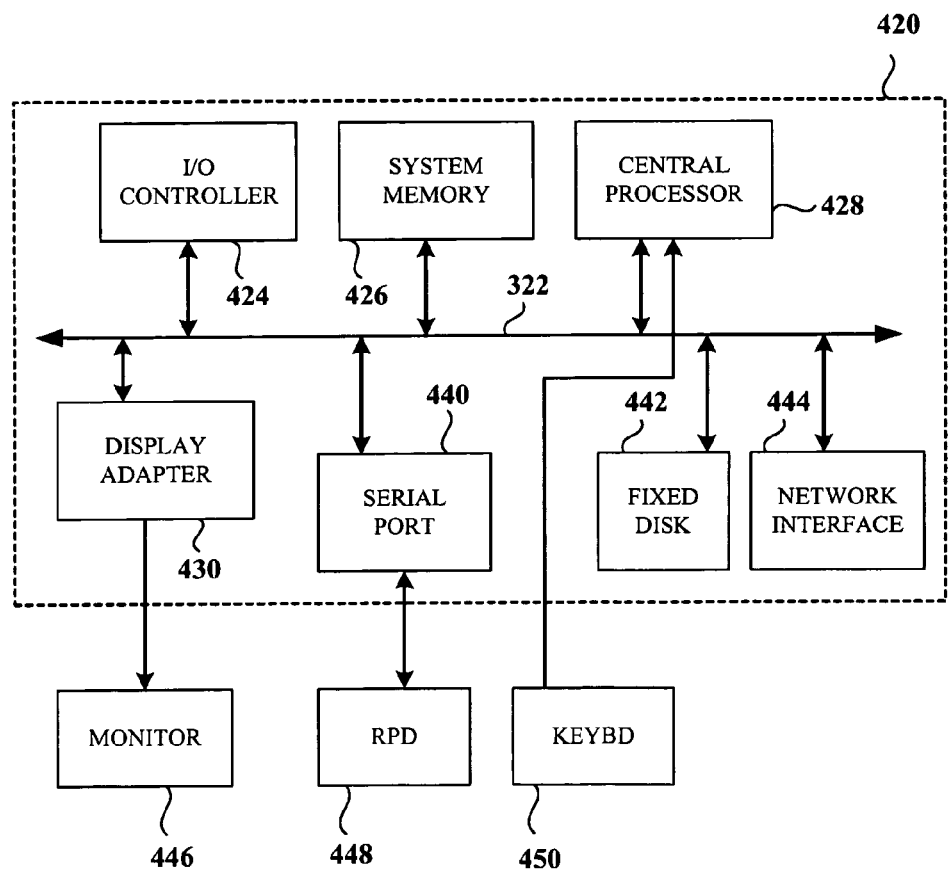
FIG. 4B shows subsystems in the computer system of FIG. 4A.

FIG. 4B illustrates subsystems that might typically be found in a computer such as computer 400.

In FIG. 4B, subsystems within box 420 are directly interfaced to internal bus 422. Such subsystems typically are contained within the computer system such as within cabinet 407 of FIG. 4A. Subsystems include input/output (I/O) controller 424, System Random Access Memory 9 RAM) 426, Central Processing Unit (CPU) 428, Display Adapter 430, Serial Port 440, Fixed Disk 442 and Network Interface Adapter 444. The use of bus 422 allows each of the subsystems to transfer data among the subsystems and, most importantly, with the CPU. External devices can communicate with the CPU or other subsystems via the bus 422 by interfacing with a subsystem on the bus. Monitor 446 connects to the bus through Display Adapter 430. A relative pointing device (RPD) 448 such as a mouse connects through Serial Port 440. Some devices such as a Keyboard 450 can communicate with the CPU by direct means without using the main data bus as, for example, via an interrupt controller and associated registers (not shown).

As with the external physical configuration shown in FIG. 4A, many subsystem configurations are possible. FIG. 4B is illustrative of but one suitable configuration. Subsystems, components or devices other than those shown in FIG. 4B can be added. A suitable computer system can be achieved without using all of the subsystems shown in FIG. 4B. For example, a standalone computer need not be coupled to a network so Network Interface 444 would not be required. Other subsystems such as a CDROM drive, graphics accelerator, etc. can be included in the configuration without affecting the performance of the system of the present invention.

Figure 4C:
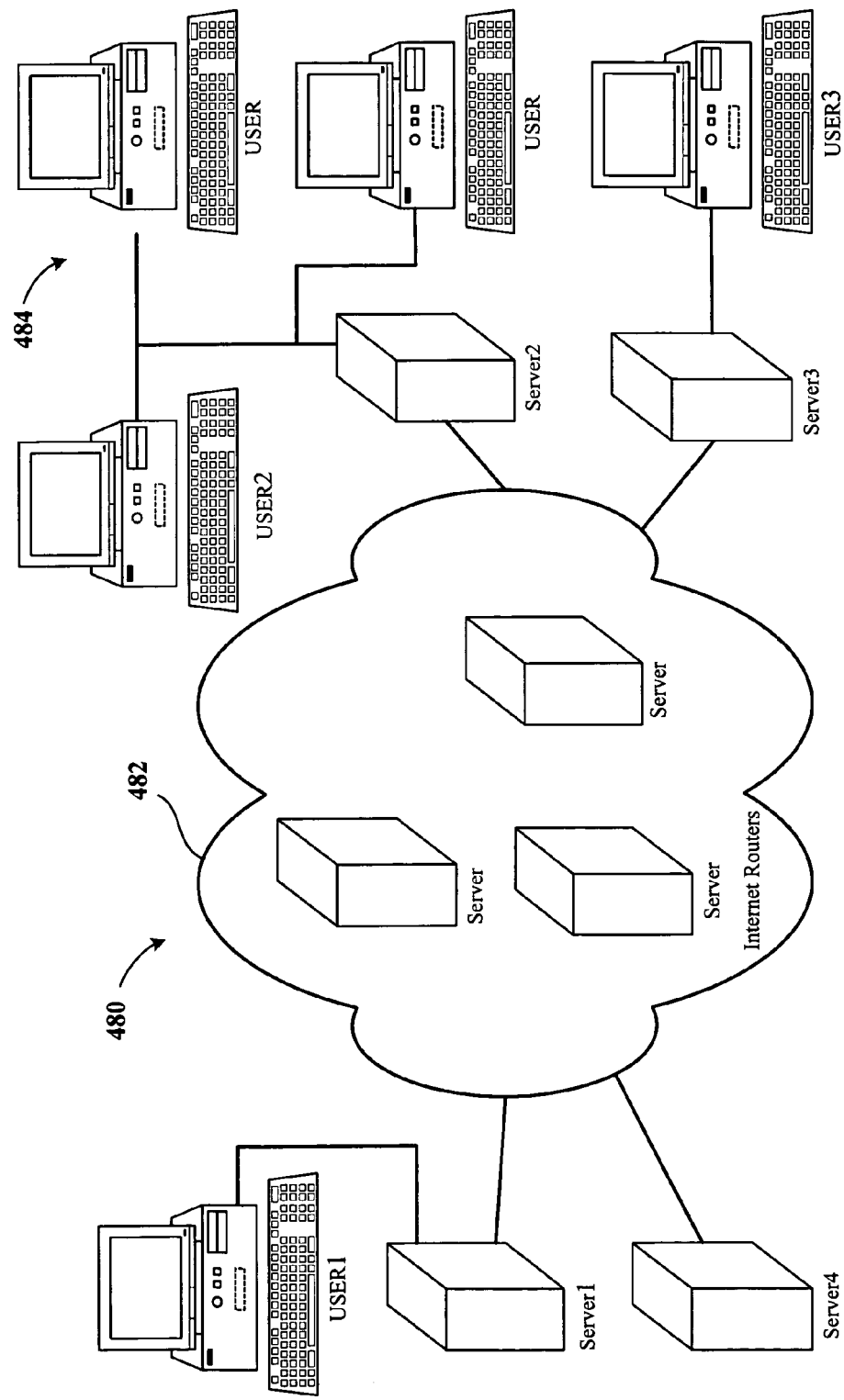
FIG. 4C is a generalized diagram of a typical network.

FIG. 4C is a generalized diagram of a typical network.

In FIG. 4C, the network system 480 includes several local networks coupled to the Internet. Although specific network protocols, physical layers, topologies, and other network properties are presented herein, the present invention is suitable for use with any network.

In FIG. 4C, computer USER1 is connected to Server1. This connection can be by a network such as Ethernet, Asynchronous Transfer Mode, IEEE standard 1553 bus, modem connection, Universal Serial Bus, etc. The communication link need not be wire but can be infrared, radio wave transmission, etc. Server1 is coupled to the Internet. The Internet is shown symbolically as a collection of sever routers 482. Note that the use of the Internet for distribution or communication of information is not strictly necessary to practice the present invention but is merely used to illustrate embodiments, above. Further, the use of server computers and the designation of server and client machines are not critical to an implementation of the present invention. USER1 Computer can be connected directly to the Internet. Server1's connection to the Internet is typically by a relatively high bandwidth transmission medium such as a T1 or T3 line.

Similarly, other computers at 484 are shown utilizing a local network at a different location from USER1 computer.

The computers at 484 are couple to the Internet via Server2. USER3 and Server3 represent yet a third installation.

Note that the concepts of "client" and "server," as used in this application and the industry are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information). Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines.

A server machine will most likely not be manually operated by a human user on a continual basis, but, instead, has software for constantly, and automatically, responding to information requests. On the other hand, some machines, such as desktop computers, are typically though of as client machines because they are primarily used to obtain information from the Internet for a user operating the machine.

Depending on the specific software executing at any point in time on these machines, the machine may actually be performing the role of a client or server, as the need may be. For example, a user's desktop computer can provide information to another desktop computer. Or a server may directly communicate with another server computer. Sometimes this characterized as "peer-to-peer," communication. Although processes of the present invention, and the hardware executing the processes, may be characterized by language common to a discussion of the Internet (e.g., "client," "server," "peer") it should be apparent that software of the present invention can execute on any type of suitable hardware including networks other than the Internet.

Although software of the present invention may be presented as a single entity, such software is readily able to be executed on multiple machines. That is, there may be multiple instances of a given software program, a single program may be executing on different physical machines, etc. Further, two different programs, such as a client a server program, can be executing in a single machine, or in different machines. A single program can be operating as a client for information transaction and as a server for a different information transaction.

A "computer" for purposes of embodiments of the present invention may include any processor-containing device, such as a mainframe computer, personal computer, laptop, notebook, microcomputer, server, personal data manager or "PIM" (also referred to as a personal information manager or "PIM") smart cellular or other phone, so-called smart card, set-top box, or any of the like. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" for purposes of embodiments of the present invention may be any medium that can contain, store, communicate, propagate, or transport the computer program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. The computer readable medium may have suitable instructions for synchronously presenting multiple video program ID streams, such as on a display screen, or for providing for input or presenting in accordance with various embodiments of the present invention.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for enabling a computer system to facilitate the encoding of communication data, the method comprising:
   a. enabling the definition of a bitmask table having a bitmask character value, wherein the bitmask character value identifies one or more character sets that include a character and the bitmask character value is adjusted based on an origin language corresponding to the character when the origin language is a Chinese, Japanese, or Korean (CJK) language and wherein the adjusted bitmask character value excludes a character set for a non-origin CJK language that includes the character;
   b. enabling the receipt of communication data, wherein the communication data includes the character;
   c. enabling the generation of a bit value based on the bitmask character value;
   d. enabling the selection of the character set based on the bit value; and
   e. enabling the encoding of the character, wherein the character is encoded based on the selected character set.

2. A method of claim 1, wherein a preferred language is a Chinese, Japanese, or Korean (CJK) language.

3. A method of claim 1, wherein the character set is a national character set.

4. A method of claim 1, wherein selecting the character set further comprises selecting the character set from one or more character sets.

5. A method of claim 1, further comprising repeating (b) through (e) for successive characters in the communication data.

6. A method as recited in claim 1, wherein the communication data is e-mail.

7. A method as recited in claim 1, wherein the communication data is received by an e-mail server.

8. A method as recited in claim 7, wherein the e-mail server is a Web-based e-mail server.

9. A method as recited in claim 7, wherein the e-mail server is a PC-based e-mail server.

10. A bitmask table for facilitating encoding communication data, the bitmask table being executed by a computer, the bitmask table comprising:
- a character number related to a character, the character number defining an index into the bitmask table; and
- a bitmask character value related to the character number, the bitmask character value identifying one or more character sets that include the character,
- wherein the bitmask character value is adjusted based on an origin language corresponding to the character when the origin language is a Chinese, Japanese, or Korean (CJK) language and wherein the adjusted bitmask character value excludes a character set for a non-origin CJK language that includes the character.

11. A bitmask table as recited in claim 10, wherein a preferred language is a Chinese, Japanese, or Korean (CJK) language.

12. A bitmask table as recited in claim 10, wherein the character number is a Unicode character number.

13. A bitmask table as recited in claim 10, wherein the character set is a national character set.

14. A computer system for facilitating encoding communication data, comprising:
- a client code module executed by the computer, the client code module capable of accepting communication data input by a user, the communication data including a character;
- a bitmask table executed by the computer, the bitmask table having a bitmask character value, the bitmask character value identifying one or more character sets that include the character wherein the bitmask character value is adjusted based on an origin language corresponding to the character when the origin language is a Chinese, Japanese, or Korean (CJK) language and wherein the adjusted bitmask character value excludes a character set for a non-origin CJK language that includes the character; and
- a server code module executed by the computer, the server code module capable of receiving communication data from the client code module, accessing the bitmask character value and encoding the communication data based on the bitmask character value.

15. The system as recited in claim 14, wherein the client code module is a web browser module.

16. The system as recited in claim 14, wherein the client code module is a "fat client" module.

17. The system as recited in claim 14, wherein a preferred language is a Chinese, Japanese, or Korean (CJK) language.

18. The system as recited in claim 14, wherein the character set is a national character set.

19. A non-transitory computer-readable media for directing a computer to facilitate the encoding of communication data, the computer-readable media comprising:
- instructions for defining a bitmask table having a bitmask character value, wherein the bitmask character value identifies one or more character sets that include a character and the bitmask character value is adjusted based on an origin language corresponding to the character when the origin language is a Chinese, Japanese, or Korean (CJK) language and wherein the adjusted bitmask character value excludes a character set for a non-origin CJK language that includes the character;
- instructions for receiving communication data, wherein the communication data includes the character;
- instructions for generating a bit value based on the bitmask character value;
- instructions for selecting the character set based on the generated bit value; and
- instructions for encoding the character, wherein the character is encoded based on the selected character set.

20. The computer-readable media as recited in claim 19, wherein the client code module is a web browser module.

21. The computer-readable media as recited in claim 19, wherein the client code module is a "fat client" module.

22. The computer-readable media as recited in claim 19, wherein a preferred language is a Chinese, Japanese, or Korean (CJK) language.

23. The computer-readable media as recited in claim 19, wherein the character set is a national character set.

* * * * *